United States Patent
Chen

(10) Patent No.: US 8,616,120 B2
(45) Date of Patent: Dec. 31, 2013

(54) ROTATABLE LOCK CATCH AND GRILLING DEVICE WITH ROTATABLE LOCK CATCH

(75) Inventor: Dongmei Chen, Zhangzhou (CN)

(73) Assignee: Tsann Kuen (Zhangzhou) Enterprise Co., Ltd., Zhangzhou (CN)

( * ) Notice: Subject to any disclaimer, the term of this patent is extended or adjusted under 35 U.S.C. 154(b) by 179 days.

(21) Appl. No.: 13/254,270

(22) PCT Filed: Mar. 4, 2010

(86) PCT No.: PCT/CN2010/070870
§ 371 (c)(1),
(2), (4) Date: Sep. 1, 2011

(87) PCT Pub. No.: WO2010/105523
PCT Pub. Date: Sep. 23, 2010

(65) Prior Publication Data
US 2012/0000373 A1  Jan. 5, 2012

(30) Foreign Application Priority Data
Mar. 18, 2009  (CN) ..................... 2009 2 0137237 U

(51) Int. Cl.
*A47J 37/06* (2006.01)
(52) U.S. Cl.
USPC ............... 99/372; 99/379; 99/380; 70/182; 70/159; 70/189; 292/153; 292/216; 292/245; 292/341.15
(58) Field of Classification Search
USPC ........... 99/372, 373, 374, 375, 376, 377, 378, 99/379, 380, 381, 382, 383, 395, 396, 397, 99/398; 70/159, 158, DIG. 8, DIG. 9, 182, 70/189; 292/341.15, 216, 245, 153
See application file for complete search history.

(56) References Cited

U.S. PATENT DOCUMENTS

| | | | |
|---|---|---|---|
| 2007/0006740 A1* | 1/2007 | Lam | 99/372 |
| 2007/0017384 A1* | 1/2007 | Serra | 99/372 |
| 2007/0074629 A1* | 4/2007 | Lubowicki et al. | 99/372 |

FOREIGN PATENT DOCUMENTS

| | | |
|---|---|---|
| CN | 2605801 | 3/2004 |
| CN | 2640382 Y | 9/2004 |
| CN | 101336807 A | 1/2009 |
| CN | 201398883 Y | 2/2010 |
| JP | 6311935 A | 11/1994 |
| KR | 20030080881 A | 10/2003 |

\* cited by examiner

*Primary Examiner* — Reginald L Alexander
(74) *Attorney, Agent, or Firm* — Rabin & Berdo, P.C.

(57) ABSTRACT

A grilling device with the rotatable lock catch, has a pin module and a rotary shaft joint with two semi-shafts. The upper half shaft of the rotary shaft has a post rod, the lower half shaft of the rotary shaft has a through hole for accommodating the passing in and out of the post rod. The upper end of a supporting shelf of the pin module is disposed with a U-shaped opening for adapting the rotary shaft, two short shafts are respectively disposed by the two sides of the U-shaped opening, two arc-shaped spacing flakes with opposite openings are respectively hinged joint with the corresponding short shafts. A movable ejector pin is disposed on the supporting shelf and along the midline of the U-shaped opening. A pressing board of the middle portion of the ejector pin upward presses the lower portions of the two spacing flakes.

10 Claims, 5 Drawing Sheets

ROTATABLE LOCK CATCH AND GRILLING DEVICE WITH ROTATABLE LOCK CATCH

FIELD OF THE INVENTION

The present invention relates to a mechanism with lockable rotary shaft and a device which can lock the rotary shaft, especially relates to a mechanism utilizing the rotation of a rotary shaft joint with two semi-shafts to lock said rotary shaft assembly and a device utilizing said locking mechanism.

BACKGROUND OF THE INVENTION

The existing grilling device for grilling the double sides of food such as muffin, the main body of which comprises an upper grilling plate and a lower grilling plate, the rear end of the upper grilling plate is pivoted with the rear end of the lower grilling plate, so the upper grilling plate can be opened relative to the lower grilling plate and the food can be conveniently put into the grilling device. In order that the food can be uniformly grilled, the two sides of the food need fully contact with the upper grilling plate and the lower grilling plate, so the grilling device needs to be turned over with 180° during the grilling process, therefore the lower side of food can fully contact with the lower grilling plate by the own weight of the food. The front and rear portions of the main body of the grilling device are respectively disposed with a front rotary shaft and a rear rotary shaft, said front and rear rotary shafts are respectively installed on the front and rear foot rests of the installing shelf, the main body of the grilling device can turn over relative to the installing shelf with the rotary shaft, so the food can be turned over with 180° for grilling. Since the front ends of the upper grilling plate and the lower grilling plate can separate with each other, so the rotary shaft disposed on the front portion of the main body of the grilling device is divided into an upper half shaft and a lower half shaft, when the upper half shaft closes with the lower half shaft oppositely, the function of the rotary shaft can be realized, when the upper half shaft separates with the lower half shaft, the upper and lower grilling plates are all opened. In order to prevent the upper grilling plate or the lower grilling plate to be upward jacked by the expansion of the inside grilled food, the solution of the existing technique is to add a lock catch device between the upper grilling plate and the lower grilling plate, when the upper half shaft closes oppositely with the lower half shaft, they are locked by the lock catch device to prevent separation. The user needs to additionally lock or release the lock catch device during the operation process, therefore it is inconvenient. Similarly, in the occasions of utilizing a turning over closing module, it also needs a lock catch device for locking the upper half shaft and the lower half shaft when they are closed oppositely to prevent separation.

SUMMARY OF THE INVENTION

The present invention is to provide a rotary lock catch, it only needs a rotary shaft joint with two semi-shafts which can be locked and released quickly.

The second objective of the present invention is to provide a grilling device with a rotatable lock catch, by quickly locking or releasing the rotary shaft joint with an upper half shaft and a lower half shaft, the upper grilling plate can close oppositely with the lower grilling plate and then turn over together, or the upper grilling plate can separate with the lower grilling plate.

The technical solution of the present invention is: rotatable lock catch, which has a pin module and a rotary shaft joint with two semi-shafts; the upper half shaft of said rotary shaft has a post rod, the lower half shaft of said rotary shaft has a through hole for accommodating the passing in and out of said post rod; the upper end of a supporting shelf of said pin module is disposed with a U-shaped opening for adapting said rotary shaft, two short shafts are respectively disposed by the two sides of said U-shaped opening, two arc-shaped spacing flakes with opposite openings are respectively hinged joint with the corresponding short shafts; a movable ejector pin is disposed on the supporting shelf and along the midline of said U-shaped opening; a pressing board of the middle portion of said ejector pin upward presses the lower portion of the two spacing flakes; the upper portion of said ejector pin moves between the position of passing out of the U-shaped opening and the position of passing into the U-shaped opening to insert into said through hole of the lower half shaft, while the upper portions of the two spacing flakes correspondingly passes into the U-shaped opening for holding said rotary shaft or passes out of the U-shaped opening for releasing said rotary shaft.

Said supporting shelf has a base board, a U-shaped board and a conduit; the U-shaped opening of the upper end of the base board is disposed with a U-shaped board for adapting the rotary shaft, the two sides of said U-shaped board on the base board are respectively disposed with a short shaft, the lower end of the base board has a conduit for accommodating the lower portion of the ejector pin move upward and downward; the two side walls of said U-shaped board are respectively disposed with a long groove for the upper portions of the corresponding spacing flakes pass through, the bottom of said U-shaped board is disposed with an ejector hole for the upper portion of the ejector pin pass through.

The corresponding surfaces of the lower portions of said two spacing flakes respectively have an inclined board to correspondingly contact with the inclined surfaces of the two sides of the pressing board of the ejector pin.

The lower end portions of said two spacing flakes are respectively disposed with an extension spring.

The second objective of the present invention is realized by: grilling device with rotatable lock catch, the upper grilling plate closes with each other oppositely, the upper half shaft of the front side of said upper grilling plate is joint with the lower half shaft of the front side of said lower grilling plate to form a relative rotary shaft; said rotary shaft is detachably disposed on the front side of an installing shelf; wherein the upper half shaft of the upper grilling plate is disposed with a post rod, the lower half of the lower grilling plate has a through hole for accommodating the passing in and out of said post rod; the upper end of the front side of the installing shelf is disposed with a pin module, the upper end of a supporting shelf of said pin module is disposed with a U-shaped opening for adapting said rotary shaft, two short shafts are respectively disposed by the two sides of said U-shaped opening, two arc-shaped spacing flakes with opposite openings are respectively hinged joint with the corresponding short shafts; a movable ejector pin is disposed on the supporting shelf and along the symmetrical of said U-shaped opening; a pressing board of the middle portion of said ejector pin upward presses the lower portions of the two spacing flakes; the upper portion of said ejector pin moves between the position of passing out of the U-shaped opening and the position of passing into the U-shaped opening to insert into said through hole of the lower half shaft, while the upper portions of the two spacing flakes correspondingly passes into the U-shaped opening for holding said rotary shaft or passes out of the U-shaped opening to release said rotary shaft.

Said supporting shelf has a base board, a U-shaped board and a conduit; the U-shaped opening of the upper end of the base board is disposed with a U-shaped board for adapting the rotary shaft, the two sides of said U-shaped board on the base board are respectively disposed with a short shaft, the lower end of the base board has a conduit for accommodating the lower portion of the ejector pin move upward and downward; the two side walls of said U-shaped board are respectively disposed with a long groove for the upper portions of the corresponding spacing flakes to pass through, the bottom of said U-shaped board is disposed with an ejector hole for the upper portion of the ejector pin pass through. Said supporting shelf is an assembly mechanism utilizing the bottom board, U-shaped board and conduit, the integrity of the module is promoted; it is helpful for widely application.

The corresponding surfaces of the lower portions of said two spacing flakes respectively have an inclined board to correspondingly contact with the inclined surfaces of the two sides of the pressing board of the ejector pin. Said mechanism can add two contacting surfaces between the spacing flake and the pressing board of the ejector pin, so the abrasion can be relived, thereby the service life of the machine will be prolonged.

The lower end portions of said two spacing flakes are respectively disposed with an extension spring, the two spacing flakes can reset by the extension spring, so the two spacing flakes can move more flexible when the rotary shaft is released.

The rotary lock catch of the present invention, which utilizes the above structure; when the upper half shaft closes oppositely with the lower half shaft to form the rotary shaft and then they are put into the U-shaped opening of the upper end of the supporting shelf of the pin module, the post rod of the upper half shaft is inserted into the through hole of the lower half shaft. And the upper portion of the ejector pin is extruded from the U-shaped opening; the pressing board of the middle portion of the ejector pin upward presses the lower portions of the two spacing flakes from the opposite two sides, so the upper portions of the two spacing flakes correspondingly insert into the U-shaped opening and hold said rotary shaft; rotates said rotary shaft again, the upper half shaft will be restricted by the upper portions of the two spacing flakes and the through hole of the lower half shaft. Only by rotating the rotary shaft again and making the through hole of the lower half shaft overlap the upper portion of the ejector pin, lifts the upper half shaft, so the upper portions of the two spacing flakes will be extruded outward and then withdraw from the U-shaped opening, therefore the rotary shaft can be released. The lower portions of the two spacing flakes will enclose inward and lift the pressing board of the middle portion of the ejector pin; the upper end of the ejector pin will enter the U-shaped opening until the post rod of the upper half shaft withdraw from the through hole of the lower half shaft, while the upper portion of the ejector pin inserts into the through hole of the lower half shaft in the U-shaped opening. Thus it only needs to rotate the rotary shaft joint with the two semi-shafts, the objective of quickly locking and releasing said rotary shaft can be realized. The structure and the assembly relation of the device is simple, it is convenient and easy for operation. The supporting shelf is an assembly mechanism utilizing the bottom board, U-shaped board and conduit, they form a module, so it will be convenient for assembling and flexibly utilized in other occasions, the application field will be widened.

The grilling device utilizing said rotatable lock catch, the rotary shaft can be formed when the upper grilling plate closes oppositely with the lower grilling plate and the upper half shaft closes oppositely with the lower half shaft, then the rotary shaft is put into the U-shaped opening of the upper end of the supporting shelf of the pin module and automatically locked by rotating, it needs no additional operation. When the upper grilling plate and the lower grilling plate reset, the rotary shaft will be automatically released by the pin module when the upper grilling plate and the lower grilling plate are opened, so the upper grilling plate and the lower grilling plate can be freely opened or closed. Not only it is convenient for locking or releasing the upper grilling plate and the lower grilling plate, it is also easy to assemble the upper grilling plate and the lower grilling plate, thus it is convenient for the user to operate.

DETAILED DESCRIPTION OF THE EMBODIMENTS

Figure 1:
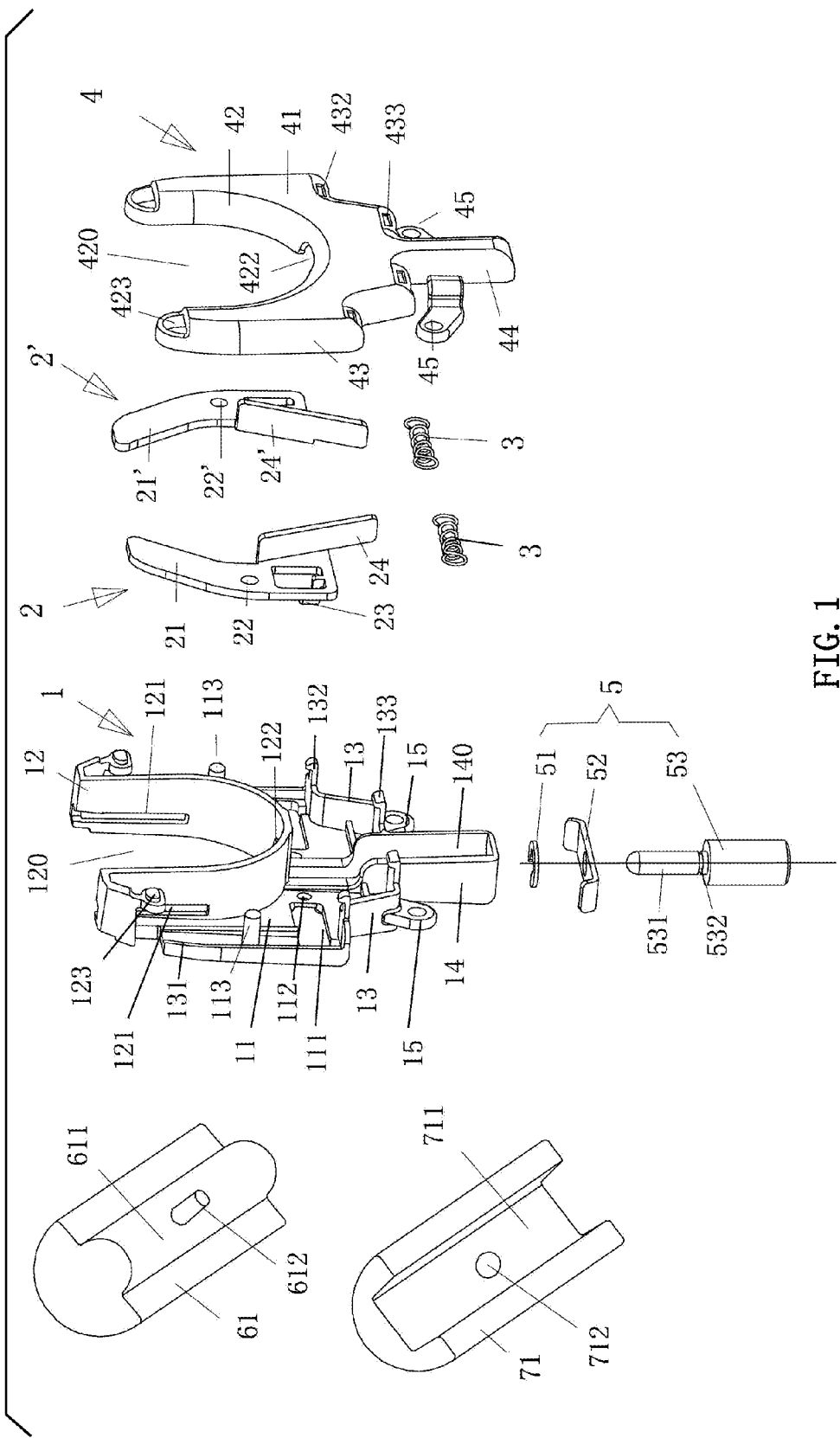
FIG. 1 illustrates the exploded structural view of an embodiment of the rotatable lock catch of the present invention.

The expanded structure of an embodiment of the rotatable lock catch of the present invention is showed in FIG. 1. Said rotatable lock catch has a pin module and a rotary shaft, wherein the pin module comprises a supporting shelf 1, a left spacing flake 2, a right spacing flake 2', an extension spring 3, a supporting cover 4 and an ejector pin 5, the rotary shaft is formed by the combination of two semi-shafts 61 and 71.

The supporting shelf 1 has a bottom board 11, a U-shaped board 12, an enclosing board 13 and a small enclosing board 14.

The bottom board 11 is Y-shaped, the upper end of which has an U-shaped opening, an window 111 and a small hole 112 are respectively disposed under the two sides of the U-shaped opening. Two short shafts 113 which extend forward are respectively disposed by the two sides of said U-shaped opening of the bottom board 11.

The U-shaped board 12 extends forward and disposed on the opening of the U-shaped opening of the upper end of the bottom board 11. The opening 120 of the U-shaped board 12 can adapt the rotary shaft. The two side walls of the U-shaped board 12 respectively allows the upper portions of the relative spacing flakes 2 and 2' passing through the long groove 121, an ejector pin hole 122 is disposed on the bottom of the U-shaped board 12 for allowing the upper portion of the ejector pin 5 passing through, the top portions of the two side walls of the U-shaped board 12 respectively extends sideways and downward to form a positioning block 123.

The two step-shaped enclosing boards 13 are respectively disposed by the two sides of the U-shaped board 12, then extend forward to connect with the relative edges of the bottom board 11 as an integrity and respectively encircles the window 111, the small hole 112 and the short shaft 113 of the same side. The longitudinal long strip section of each enclosing board 13 has a long notch 131, they respectively provides space for the relative spacing flakes 2 and 2'. The transverse upper strip section of each enclosing board 13 respectively disposed with an upper clamping hook 132 extending forward, the transverse lower strip section of each enclosing board 13 respectively disposed with an lower clamping hook 133. The transverse lower strip section of the two enclosing board 13 are respectively disposed with a lug 15 having a hole.

The shape of the small enclosing board 14 is like an inverted "Π", it extends forward and disposed on the handle portion of the bottom board 11, that is along the midline of the U-shaped opening and on the lower end of the bottom board 11. The inside of the small enclosing board 14 forms a conduit 140 for accommodating the lower portion of the ejector pin 5 moving upward and downward. The upper portion of the small enclosing board 14 is open and opposite the ejector hole 122 of the U-shaped board 12.

The main body 21 of the left spacing flake 2 is arc-shaped, the middle portion of said main body 21 has a shaft hole 22; the lower portion of said main body 21 has a hook 23 extending backward. The lower portion of the inner arc-shaped surface of said main body 21 has an inclined board 24 with an inclined surface. The main body 21' of the right spacing flake 2' is arc-shaped, the opening of which is opposite the arc-shaped opening of the main body 21 of the left spacing flake 2. The middle portion of said main body 21' has a shaft hole 22'; the lower portion of said main body 21' has a hook extending backward. The lower portion of the inner arc-shaped surface of said main body 21' has an inclined board 24' with an inclined surface.

The supporting cover 4 is Y-shaped, the upper end of which has a U-shaped opening. The U-shaped opening is disposed with a U-shaped board 42 extending backward. The opening 420 of the U-shaped board 42 of the supporting cover 4 can adapt the U-shaped board 12 of the supporting shelf 1. The bottom of the U-shaped board 42 is disposed with a notch 422 opposite the ejector hole 122 of the U-shaped board 12 of the supporting shelf 1, so the upper portion of the ejector pin 5 is allowed to be passed through. The top portion of the two side walls of the U-shaped 42 respectively encloses to form a small space 423 for accommodating the relative positioning block 123 of the U-shaped board 12 of the supporting shelf 1. The two sides of the supporting cover 4 respectively disposed with a step-shaped enclosing board 43 extending backward, the enclosing boards 43 respectively covers on the enclosing board 13 of the supporting shelf 1. The transverse upper strip sections of the two enclosing board 43 respectively disposed with a clamping hook hole 432, the transverse lower strip sections of which is respectively disposed with a clamping hook hole 433. The handle of the supporting cover 4 is disposed with an inverted "Π"-shaped small enclosing board 44 extending backward, the small enclosing board 44 can cover the conduit 140 of the supporting shelf 1 correspondingly. The two sides of the small enclosing board 44 are respectively disposed with a lug 45 having a hole.

The main body of the ejector pin 5 is a step-shaped shaft 53, the diameter of the lower portion of said step-shaped shaft 53 is larger, the diameter of the upper portion 531 of said step-shaped shaft 53 is smaller. Said upper portion 531 has a circular groove 532 which closes to its root portion. The middle portion of the pressing board 52 has a hole, the two sides of which upwarp. The upper portion 531 of the step-shaped shaft 53 is sleeved in the hole of the pressing board 52, an E-type clamping ring 51 is inserted into the circular groove 532 of the upper portion 531 of the step-shaped shaft 53, so the pressing board 52 is connected to the step-shaped shaft 53.

The middle of the inner side surface of the upper half shaft 61 has a ridge 611, the middle portion of said ridge 611 protrudes to form a post rod 612. The middle portion of the inner side surface of the lower half shaft 71 has a concave groove 711 accommodating said ridge 611; the middle portion of said concave groove 711 has a through hole 712 for accommodating the passing in and out of said post rod 612.

Figure 2:
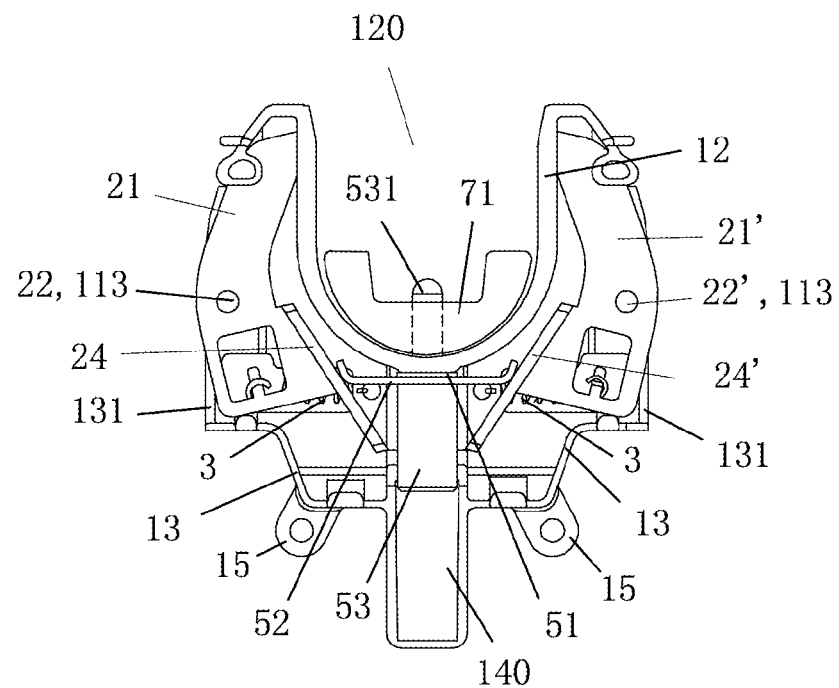
FIG. 2 illustrates the structural view of the embodiment in FIG. 1 when the upper half shaft is not put in the rotatable lock catch.

Please refer to FIG. 2: the two arc-shaped spacing flakes 2, 2' with opposite openings are respectively hinged on the relative short shafts 113 of the supporting shelf 1. The left end of the first extension spring 3 is linked to the hook 23 of the left spacing flake 2 passing through the left side window 11 of the supporting shelf 1, the right end of said extension spring 3 is linked to the small hole 112 of the left side of the supporting shelf 1. The right end of the second extension spring 3 is linked to the hook of the right spacing flake 2' passing through the left side window 11 of the supporting shelf 1, the left side of said second extension spring 3 is linked to the small hole 112 of the right side of the supporting shelf 1. The two extension springs 3 pull the lower end portions of the two spacing flakes 2,2' to close to the midline of the supporting shelf 1. the lower portion of the step-shaped shaft 53 of the ejector pin 5 is disposed in the conduit 140 of the supporting shelf 1 and can move up and down. The upper portion 531 of the step-shaped shaft 53 is straightly opposite the ejector hole 122 of the U-shaped board 12 of the supporting shelf 1, which can pass in or out of the opening 120 of the U-shaped board 12. After the upper portion 531 of the stepped-shaped shaft 53 enters the opening 120 of the U-shaped board 12, it will be rightly inserted into the through hole 712 of the lower half shaft 71. The inclined surfaces of the two sides of the pressing board 52 respectively contacts with the relative inclined boards 24, 24' of the lower portions of the two spacing flakes 2, 2'. The upper portions of the two spacing flakes 2,2' are located out of the opening of the U-shaped board 12 of the supporting shelf 1.

Figure 3:
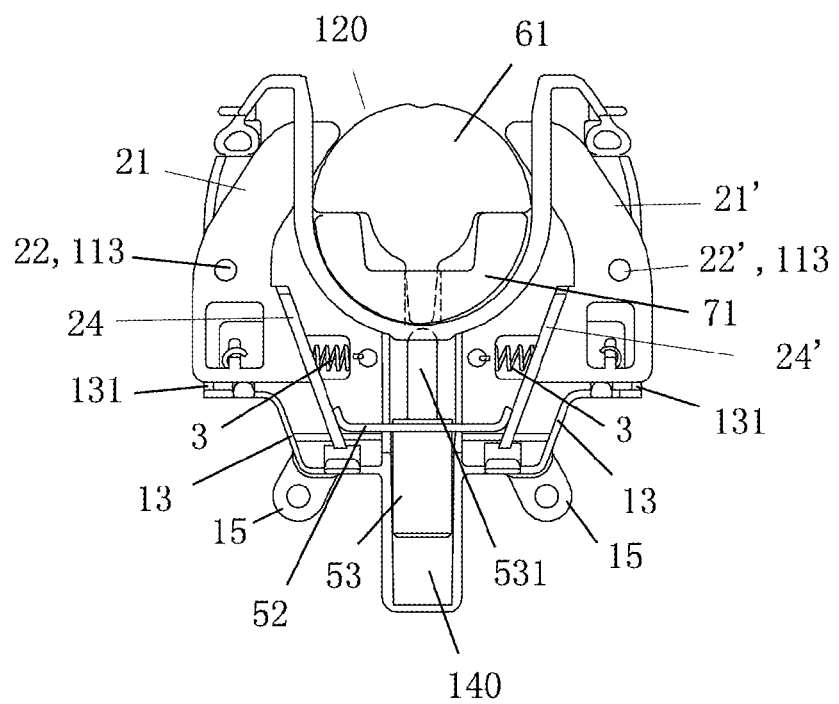
FIG. 3 illustrates the structural view of the embodiment in FIG. 1 when the upper half shaft is put in the rotatable lock catch.

When the upper half shaft 61 is put into the opening 120 of the U-shaped board 12 of the supporting shelf 1, it will be joint with the lower half shaft 71 to form the relative rotary shaft, please refer to FIG. 3: the ridge 611 of the upper half shaft 61 falls into the concave groove 711 of the lower half shaft 71, the post rod 612 of the upper half shaft 61 is inserted into the through hole 712 of the lower half shaft 71. At this time, the ejector pin 5 moves downward, the upper portion 531 of the step-shaped shaft 53 withdraws from the opening 120 of the U-shaped board 12 of the supporting shelf 1, the pressing board 52 of the middle portion of the step-shaped shaft 53 downward pushes the inclined boards 24,24' of the lower portions of the two spacing flakes 2,2', so the upper portions of the two spacing flakes 2,2' will roll over inward and hold said rotary shaft by extending into the U-shaped opening 120 through the corresponding long groove 121 of the U-shaped board 12. If the user rotates said rotary shaft, the upper half shaft 61 will be restricted in the opening 120 of the U-shaped board 12 by the upper portions of the two spacing flakes 2,2' and the through hole 712 of the lower half shaft 71, and will not separate with the lower half shaft 71; at this time the two extension springs will be stressed to tightly lock the two spacing flakes 2,2'.

When the user needs to separate the upper and lower grilling plates, he firstly rotates said rotary shaft, so the through hole 712 of the lower half shaft 71 will overlap the upper portion 531 of the step-shaped shaft 53 of the ejector pin 5, then lifts the upper half shaft 61, so the upper portions of the two spacing flakes 2,2' will be extruded outward, and the lower portions of the two spacing flakes 2,2' will enclose toward the midline of the supporting shelf 1 and lift the ejector pin 5 by extruding the pressing board 52 of the middle of the step-shaped shaft 53; meanwhile the two extension springs will reset to assist the lower end portions of the spacing flakes 2,2' close toward the midline of the supporting shelf 1. Until the upper portions of the spacing flakes 2,2' withdraws from the opening 120 of the U-shaped board 12 to release said rotary shaft, while the upper portion 531 of the step-shaped shaft 53 of the ejector pin 5 enters the opening 120 of the U-shaped board 12, and the post rod 612 of the upper half shaft 61 withdraws from the through hole 712 of the lower half shaft 71, and inserts into the through hole 712 of the lower half shaft 71 through the upper portion 531 of the step-shaped shaft 53.

Figure 4:
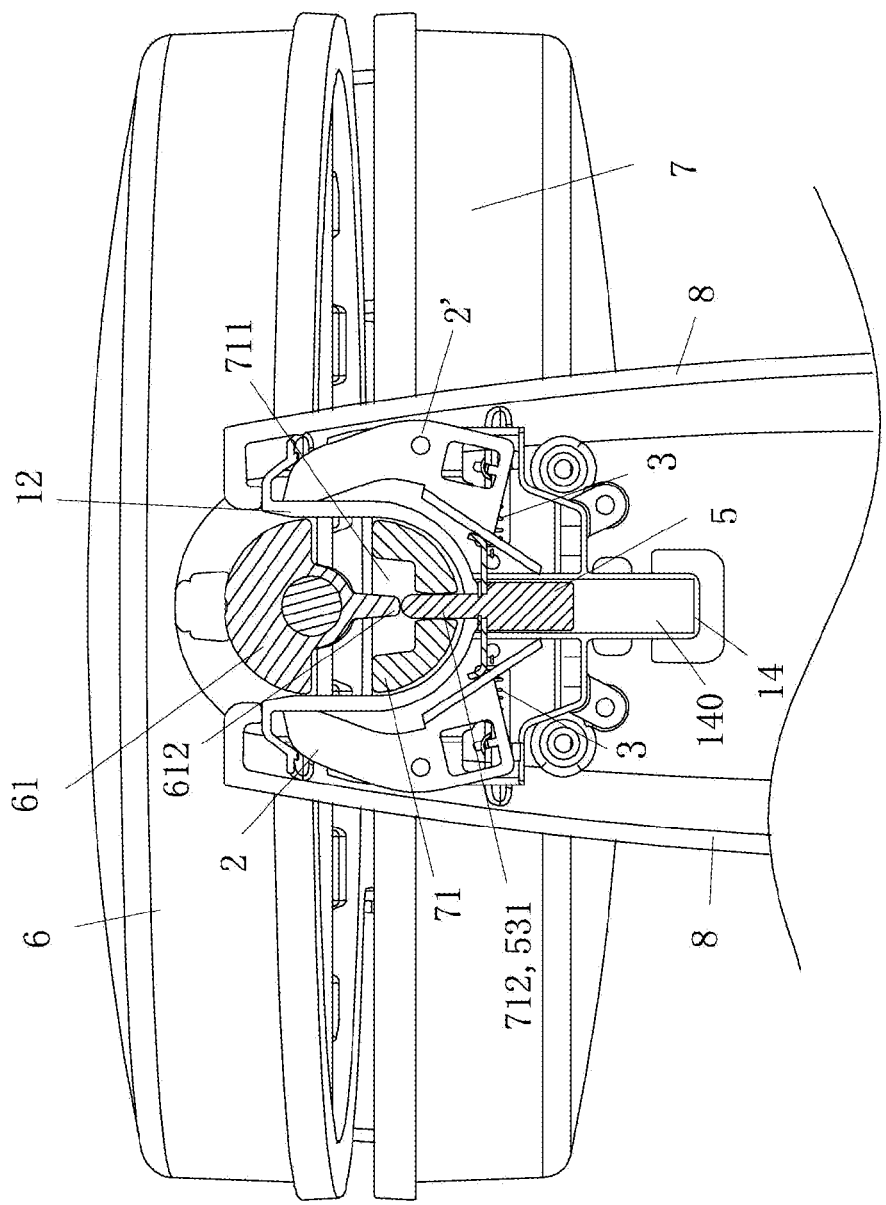
FIG. 4 illustrates the structural view of a grilling device utilizing the rotatable lock catch of FIG. 1 when the upper grilling plate separates from the lower grilling plate.

The structure of the double side grilling device utilizes above rotatable lock catch, which is showed in FIG. 4. The main body of said grilling device is divided into an upper grilling plate 6 and a lower grilling plate 7, the rear portions of the upper and lower grilling plates are pivoted together, so the upper grilling plate 6 can be opened relative to the lower grilling plate 7, and the food can be put into the grilling device. The front and rear portions of the main body are respectively disposed with a front rotary shaft and a rear rotary shaft. The front rotary shaft disposed on the front portion of the main body is divided into the upper half shaft 61 located on the front side of the upper grilling plate 6 and the lower half shaft 71 located on the front side of the lower grilling plate 7, the upper grilling plate 6 overlaps and closes oppositely with the lower grilling plate 7, the upper half shaft 61 and the lower half shaft 71 are joint together to form the relative front rotary shaft. The rear rotary shaft is disposed on the rear side of the lower grilling plate 7 and coaxially with the front rotary shaft. Said front rotary shaft and the rear rotary shaft are respectively installed on the front and rear foot rests of the installing shelf 8. The upper grilling plate 6 and the lower grilling plate 7 can roll over relative to the installing shelf 8 through the front and rear rotary shaft, so the food can be turned over with 180° for grilling.

When the upper half shaft 61 separates with the lower half shaft 71, the upper grilling plate 6 and the lower grilling plate 7 will open. In order to prevent the upper grilling plate or the lower grilling plate to be upward jacked by the expansion of the inside grilled food, said rotatable lock catch device is disposed on the upper end of the front foot rest of the installing shelf 8, the detailed structure of the rotatable lock catch device need not to be described again. When the upper half shaft 61 overlaps the lower half shaft 71 and they close with each other, said rotatable lock catch will lock the upper half shaft 61 and the lower half shaft 71, so the upper grilling plate 6 and the lower grilling plate 7 are prevented from separating.

When the front portions of the upper grilling plate and the lower grilling plates are separated, the ridge 611 of the upper half shaft 61 will maintain a certain distance with the concave groove 711 of the lower half shaft 71. The post rod 612 of the upper half shaft 61 will hang in the air. Meantime, the upper portions of the two spacing flakes 2,2' are located outside of the opening 120 of the U-shaped board 12, the upper portion 531 of the step-shaped shaft 53 of the ejector pin 5 enters the opening 120 of the U-shaped board 12 and inserts into the through hole 712 of the upper half shaft 71, and the lower half shaft 71 can not rotate.

Figure 5:
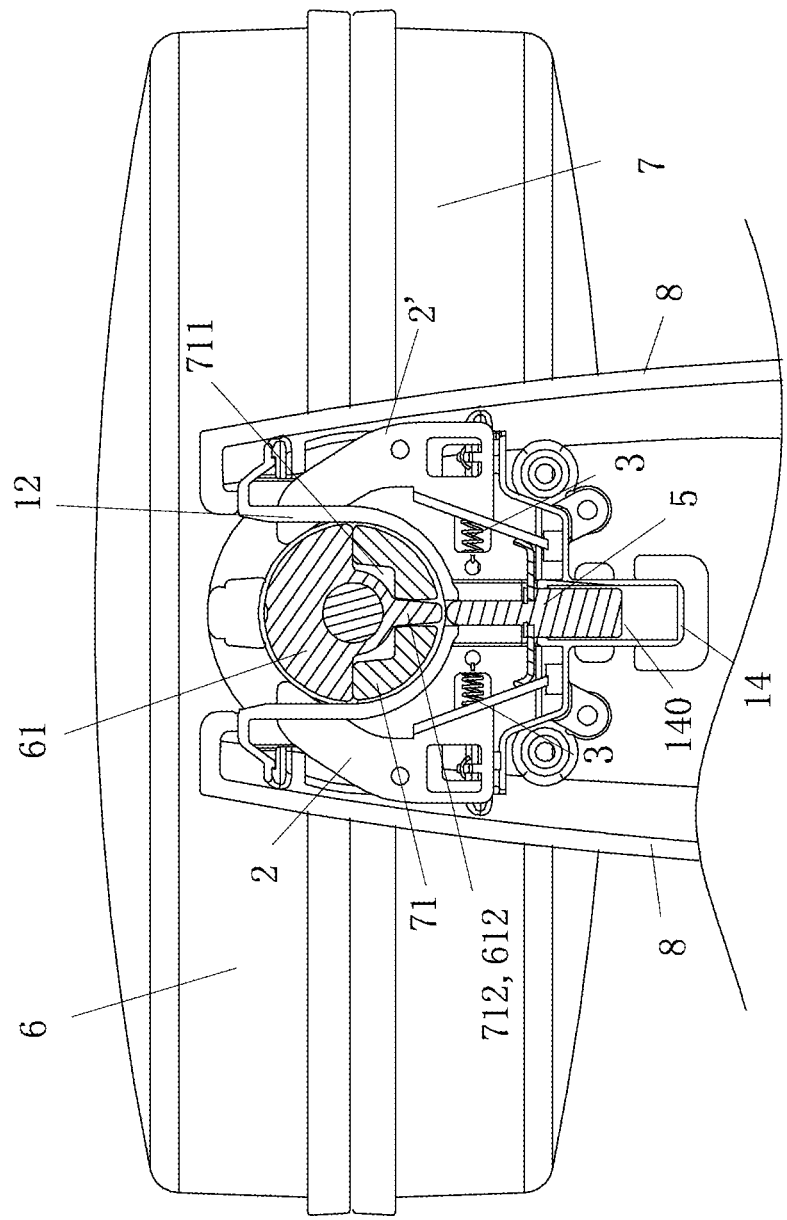
FIG. 5 illustrates the structural view of a grilling device of FIG. 4 when the upper grilling plate closes oppositely with the lower grilling plate and the two grilling plates are not locked.

When the front portions of the upper grilling plate 6 and the lower grilling plate 7 are locked, please refer to FIG. 5: the upper half shaft 61 is in the opening 120 of the U-shaped board 12 and joint with the lower half shaft 71 to form the front rotary shaft. The ridge 611 of the lower half shaft 61 falls into the concave groove 711 of the lower half shaft 71, the post rod 612 of the upper half shaft 61 inserts into the through hole 712 of the lower half shaft 71. Meantime, the ejector pin 5 moves downward, the upper portion 531 of the step-shaped shaft 53 withdraws from the opening 120 of the U-shaped board 12 of the supporting shelf 1, the pressing board 52 of the middle of the step-shaped shaft 53 pushes downward the inclined boards 24,24' of the lower portions of the two spacing flakes 2,2', so the upper portions of the two spacing flakes 2,2' will roll over inward and hold the front rotary shaft by extending into the U-shaped opening 120 through the relative long groove 121 of the U-shaped board 12.

If the user rotates the front rotary shaft, that is to make the upper grilling plate 6 and the lower grilling plate 7 deflect relative to the installing shelf 8, so the upper half shaft 61 will be restricted in the opening 120 of the U-shaped board 12 by the upper portions of the two spacing flakes 2,2' and the through hole 712 of the lower half shaft 71, and the upper half shaft 61 can not separate with the lower half shaft 71, therefore the upper grilling plate 6 can not separate with the lower grilling plate 7.

Figure 6:
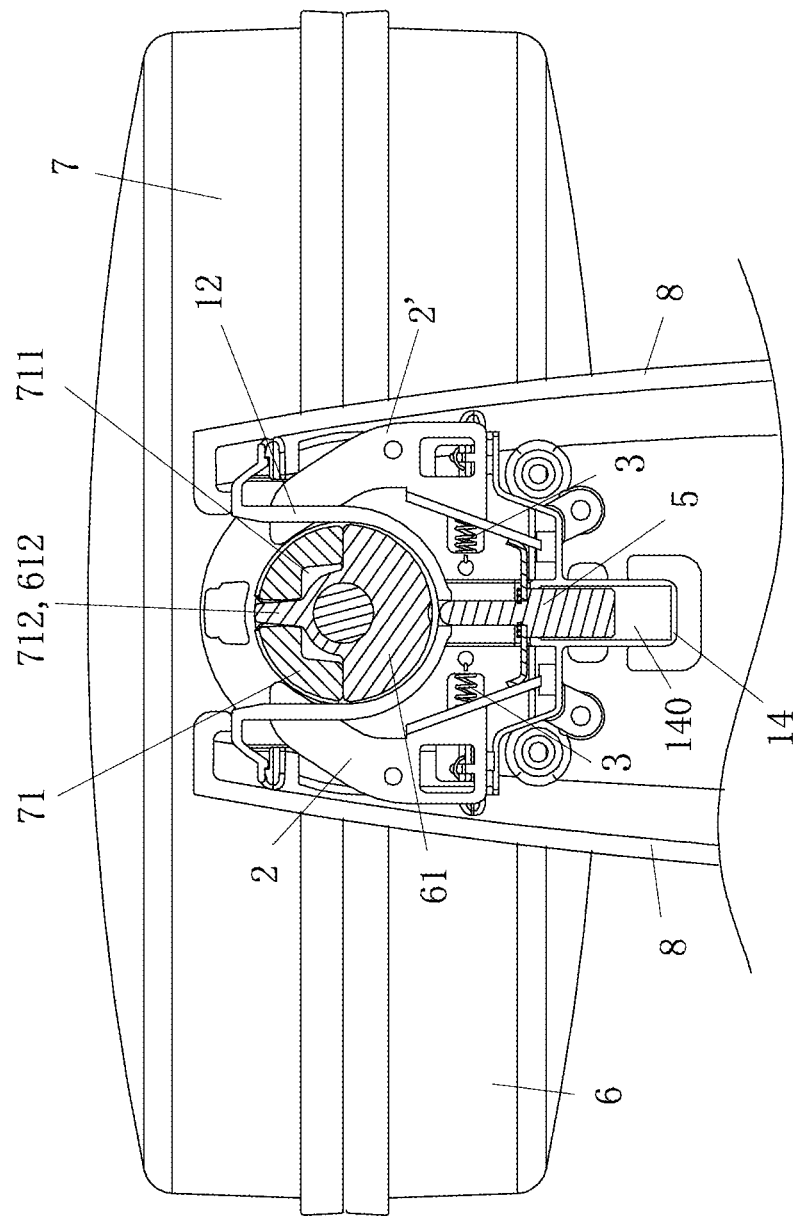
FIG. 6 illustrates the structural view of a grilling device of FIG. 4 when the upper grilling plate closes oppositely with the lower grilling plate and the two grilling plates are locked.

If the user continues to rotate the front rotary shaft, so the upper grilling plate 6 and the lower grilling plate 7 will roll over with 180° relative to the installing shelf 8, the inverted grilling function is realized, please refer to FIG. 6: the upper half shaft 61 is restricted in the opening 120 of the U-shaped board 12 and can not separate with the lower half shaft 71 by the upper portions of the two spacing flakes 2,2' and the lower half shaft 71, therefore the upper grilling plate 6 still can not separate with the lower grilling plate 7.

If the user rotates the front rotary shaft to make the upper grilling plate 6 and the lower grilling plate 7 reset relative to the installing shelf 8. Please refer to FIG. 5: the through hole 712 of lower half shaft 71 overlaps the upper portion 531 of the step-shaped shaft 53 of the ejector pin 5. Upward lifting the upper half shaft 61, so the upper portions of the two spacing flakes 2,2' will be outward extruded, while the lower portions of the two spacing flakes 2,2' will enclose toward the midline of the supporting shelf 1 and upward jack the ejector pin 5 by utilizing the inclined boards 24,24' to extrude the pressing board 52 of the middle of the step-shaped shaft 53; meanwhile the two extension springs 3 will assist the lower end portions of the U-shaped board 12 to close to the midline of the supporting shelf 1. Until the upper portions of the two spacing flakes 2,2' withdraw from the opening 120 of the U-shaped board and releases the front rotary shaft, while the upper portion 531 of the step-shaped shaft 53 of the ejector pin 5 enters the opening 120 of the U-shaped board 12, and the post rod 612 of the upper half shaft 61 withdraws from the through hole 712 of the lower half shaft 71, and then inserts into the through hole 712 of the lower half shaft 71 through the upper portion 531 of the step-shaped shaft 53. So the upper half shaft 61 will separate with the lower half shaft 71, and the upper grilling plate 6 and the lower grilling plate 7 will open, please refer to FIG. 4.

Although the present invention has been described with reference to the preferred embodiments thereof for carrying out the invention, it is apparent to those skilled in the art that a variety of modifications and changes may be made without departing from the scope of the present invention which is intended to be defined by the appended claims.

INDUSTRIAL APPLICABILITY

The rotatable lock catch and grilling device with rotatable lock catch of the present invention, wherein its upper and lower grilling plates are overlapped and closes with each other, and its upper half shaft and the lower half shaft are overlapped and closes with each other to form a rotary shaft, then the rotary shaft is put in the U-shaped opening of the upper end of the supporting shelf of the pin module and will be automatically locked by rotating, it needs no additional operation, it is convenient to lock or release the upper and lower grilling plates, and it is easy to assemble the grilling device, therefore it has a good industrial applicability.

What is claimed is:

1. A rotatable lock catch, comprising:
a rotary shaft with an upper half shaft having a post rod, and a lower half shaft having a through hole for accommodating the passing in and out of said post rod; and
a pin module, comprising:
a supporting shelf having a U-shaped open frame for accommodating said rotary shaft at an upper end thereof;
two short shafts respectively disposed by two sides of said U-shaped shaped open frame;
two arc-shaped spacing flakes with opposite openings respectively hinged on the corresponding short shaft;
a movable ejector pin disposed on the supporting shelf along a midline of said U-shaped open frame; and
a pressing board at a middle portion of said ejector pin that upward presses lower portions of the two spacing flakes;
an upper portion of said ejector pin moving between a position of passing out of the U-shaped open frame and a position of passing into the U-shaped open frame to insert into said through hole of the lower half shaft, while upper portions of the two spacing flakes correspondingly pass into the U-shaped open frame for holding said rotary shaft or pass out of the U-shaped open frame for releasing said rotary shaft.

2. The rotatable lock catch according to claim 1, wherein said supporting shelf further comprises:
a base board, having the two short shafts, each being provided at a respective side of a U-shaped board;
the U-shaped board that defines the U-shaped open frame, and being at an upper end of the base board for accommodating the rotary shaft, and comprising:
two side walls respectively being disposed with a long groove for the upper portions of the corresponding spacing flakes to pass through; and,
a bottom of said U-shaped board being provided with ejector hole for the upper portion of the ejector pin to pass through; and,
a conduit, being disposed at a lower end of the base board for accommodating a lower portion of the ejector pin to move upward and downward.

3. The rotatable lock catch according to claim 2, wherein corresponding surfaces provided by the lower portions of said two spacing flakes respectively have an inclined board to correspondingly contact with inclined surfaces provided by two sides of the pressing board of the ejector pin.

4. The rotatable lock catch according to claim 3, wherein lower end portions of said two spacing flakes are respectively provided with an extension spring.

5. The rotatable lock catch according to claim 4, wherein when the upper portions of said two spacing flakes correspondingly pass into the U-shaped open frame and hold the rotary shaft, the extension spring will be stressed, and the two spacing flakes will be locked and fixed.

6. A grilling device with a rotatable lock catch, comprising:
an upper grilling plate;
a lower grilling plate;
an installing shelf;
a rotary shaft detachably disposed on a front side of the installing shelf and comprising:
an upper half shaft, being disposed on the upper grilling plate and having a post rod; and
a lower half shaft, being disposed on the lower grilling plate, and having a through hole for accommodating the passing in and out of said post rod;
when the upper grilling plate closes with the lower grilling plate oppositely, the upper half shaft on a front side of the upper grilling plate will joint with the lower half shaft on a front side of the lower grilling plate to form the rotary shaft; and,
a pin module, being disposed at an upper end on the front side of the installing shelf and comprising:
a supporting shelf having a U-shaped open frame for accommodating said rotary shaft at an upper end thereof;
two short shafts respectively disposed by two sides of said U-shaped open frame;
two arc-shaped spacing flakes with opposite openings respectively hinged on the corresponding short shaft;
a movable ejector pin disposed on the supporting shelf along a midline line of said U-shaped open frame; and
a pressing board at a middle portion of said ejector pin that upward presses lower portions of the two spacing flakes;
an upper portion of said ejector pin moving between a position of passing out of the U-shaped open frame and a position of passing into the U-shaped open frame to insert into said through hole of the lower half shaft, while upper portions of the two spacing flakes correspondingly pass into the U-shaped open frame for holding said rotary shaft or pass out of the U-shaped open frame to release said rotary shaft.

7. The grilling device with the rotatable lock catch according to claim 6, wherein said supporting shelf further comprises:
a base board, having the two short shafts, each being provided at a respective side of a U-shaped board for accommodating the rotary shaft;
the U-shaped board that defines the U-shaped open frame, and being at an upper end of the base board for accommodating the rotary shaft, and comprising:
two side walls respectively being disposed with a long groove for the upper portions of the corresponding spacing flakes to pass through; and
a bottom of said U-shaped board being provided with an ejector hole for the upper portion of the ejector pin to pass through; and, a conduit, being disposed at a lower end of the base board for accommodating a lower portion of the ejector pin to move upward and downward.

8. The grilling device with the rotatable lock catch according to claim 7, wherein the corresponding surfaces provided by the lower portions of said two spacing flakes respectively have an inclined board to correspondingly contact with inclined surfaces provided by two sides of the pressing board of the ejector pin.

9. The grilling device with the rotatable lock catch according to claim 8, wherein lower end portions of said two spacing flakes are respectively provided with an extension spring.

10. The grilling device with the rotatable lock catch according to claim 9, wherein when the upper portions of said two spacing flakes correspondingly pass into the U-shaped open frame and hold the rotary shaft, the extension spring will be stressed, and the two spacing flakes will be locked and fixed.

* * * * *